(12) United States Patent
Mitra

(10) Patent No.: US 12,147,780 B2
(45) Date of Patent: Nov. 19, 2024

(54) SYSTEM AND METHOD FOR MULTI-LINGUAL TRANSLATION IN MESSAGE COMMUNICATION

(71) Applicant: Daakia Private Limited, Kolkata (IN)

(72) Inventor: Bhawana Mitra, West Bengal (IN)

(73) Assignee: DAAKIA PRIVATE LIMITED, Kolkata (IN)

(*) Notice: Subject to any disclaimer, the term of this patent is extended or adjusted under 35 U.S.C. 154(b) by 0 days.

(21) Appl. No.: 18/249,184

(22) PCT Filed: Aug. 27, 2021

(86) PCT No.: PCT/IN2021/050828
§ 371 (c)(1),
(2) Date: Apr. 14, 2023

(87) PCT Pub. No.: WO2022/079731
PCT Pub. Date: Apr. 21, 2022

(65) Prior Publication Data
US 2023/0401393 A1     Dec. 14, 2023

(30) Foreign Application Priority Data
Oct. 14, 2020 (IN) .............................. 202031044812

(51) Int. Cl.
*G06F 40/58* (2020.01)
(52) U.S. Cl.
CPC .................................. *G06F 40/58* (2020.01)

(58) Field of Classification Search
CPC .... G06F 40/263; G06F 40/58; G06F 3/04817; G06F 40/40; G06F 40/04; H04L 51/046; H04L 51/18; H04L 51/04; H04L 51/063; H04L 51/066
See application file for complete search history.

(56) References Cited

U.S. PATENT DOCUMENTS

| | | | |
|---|---|---|---|
| 4,882,681 A * | 11/1989 | Brotz | ...................... H04M 3/42 704/3 |
| 5,351,189 A | 9/1994 | Doi et al. | |
| 6,292,769 B1 | 9/2001 | Flanagan et al. | |
| 2007/0208813 A1* | 9/2007 | Blagsvedt | ............... G06F 40/58 709/206 |
| 2007/0287484 A1 | 12/2007 | Chava et al. | |
| 2010/0204981 A1 | 8/2010 | Ribeiro et al. | |
| 2013/0124185 A1* | 5/2013 | Sarr | ........................ G06F 40/58 704/E11.001 |
| 2018/0158365 A1* | 6/2018 | Roche | .................... G09B 5/067 |

* cited by examiner

*Primary Examiner* — Angela A Armstrong
(74) *Attorney, Agent, or Firm* — Dinsmore & Shohl LLP

(57) ABSTRACT

A messaging system (400) comprises a user interface (404) coupled with a processor (402) and a memory (406), to display text messages; a translation selection module (414) coupled with the processor (402) and the user interface (404) to: associate a translation input selection button (203) with each of the text messages; send, upon selection translation input selection button (203), the associated text message data with language code to a messaging system server (104) for translation; receive the translated text message data from the messaging system server (104); a display module (416) coupled with the processor (402) to display the translated text message retrieve from the translated text message data with the associated translation input selection button (203) in place of the text message on the user interface (404, 201).

10 Claims, 6 Drawing Sheets

SYSTEM AND METHOD FOR MULTI-LINGUAL TRANSLATION IN MESSAGE COMMUNICATION

CROSS REFERENCES TO RELATED APPLICATIONS

This application is a national-stage application under 35 U.S.C. § 371 of International Application No. PCT/IN2021/050828, filed Aug. 27, 2021, which International Application claims benefit of priority to Indian patent application No. 202031044812, filed Oct. 14, 2020.

TECHNICAL FIELD OF THE INVENTION

The present subject matter described herein, relates to electronic devices and, in particular, to technologies related to message communication over internet in between the electronic devices and translating the text from one language to another language upon inputs from user.

BACKGROUND OF THE INVENTION

The basic idea behind translation is to convey the original intent or the idea of a message, taking into consideration, the regional and the cultural aspects between the source and the target languages. Translation enables the communication of one language (described here as source) into the other language (described here as target), without affecting the message or the content.

The need of translation existed ever since there was a will to communicate between different groups and habitats. Conventionally, an in-person translator was used to assist in translating either a live conversation or would help in translating the imprint of a foreign language on a transcript. However, the accuracy of this method solely depended on the knowledge, skill, and experience of the translator as establishing a word to word correlation while translating was not possible every time for different languages. This leads to the opportunity of misinterpretation in conveying the concepts, ideas and thoughts.

There have been various attempts involved to automate the translation through applications and other platforms, which in itself is very attractive for carrying out a high number of translations rapidly and that too at a very minimal low cost. However, due to the issues already mentioned above of specialized terminology, i.e., the vocabulary or the text of a person not being easily translated accurately. Further, with the introduction of automated translation, the accuracy problem has even worsened as the translation database currently have a hard time in interpreting context of the translated idea or thought.

While referring to the prior art U.S. Pat. No. 6,292,769, a system for the automated translation of speech having speech recognition software as input for spoken words existed in online chat or conferencing systems. Thus, in Flanagan et al., users may speak rather than type their messages and hear comments from other users. The speech data in Flanagan et al., is translated into textual data and submitted to the online information service or computer network for processing, see. column 2, lines 20-22 and lines 27-31.

Further, while referring to the prior art U.S. Pat. No. 5,351,189 to Doi et al, a machine translation system including separated side-by-side display of original and corresponding translated sentences, wherein scrolling can be done to roll through the side-by-side display of original and translated segments. The machine translation system in Doi et al., comprises a translation processor for translating an original sentence by accessing a dictionary to produce a translated sentence corresponding to the original sentence, see column 2, lines 34-39.

In the existing technologies of the message communication over internet, sender has to select translation system or third-party translation system to translate his message into his preferred language on the electronic device, for example, hand-held computing device, mobile phone, computer, tablet. Upon translating the message, the sender sends the message to the receiver.

Technical problem associated with the present existing technology is that the receiver will get all messages in the language selected by the user. To view the message in his preferred language, the receiver has to select the complete message and need to go some translation application or system to see the translation in his preferred language and again came back to messaging system for replying. It is cumbersome and difficult to handle or switch in between multiple applications for required action. With the present technical problems, the gist of technology and objective of messaging system, i.e., language is not a barrier for communication seems very fade.

Another technical problem associated with existing technologies is that the sender has freedom to send his messages in his preferred language however the receiver does not any option to translate the same in his preferred language in the messaging system. For example, a sender send message in English language, the receiver receives the same in English and does not have any means to see the message in his preferred language, like French or Italian or Hindi.

However, none of the existing arts were able to deliver a method and a system that could give freedom to the receiver to view his messages in his preferred language in the same interface of the instant messaging system. Thus, there exists a need to provide an instant messaging system having language translation at receiver end to view messages in his preferred language.

OBJECTS OF THE INVENTION

Some of the objects of the present disclosure, which at least one embodiment herein satisfy, are listed herein below.

The principal object of the present invention is to provide a messaging system that enables real time translation of the text received during communication.

Another object of the present subject matter is to provide a messaging system that is controlled by an interactive user interface that enables prompt translation of the text effectively upon selection input by the user in each message thread.

Another object of the present subject matter is to provide a messaging system that facilitate the receiver to translate the received message on the electronic device in preferred language.

Another object of the present subject matter is to provide a messaging system that is integrated with an Application Programing Interface of a translation server to perform effective translation of the text message.

Another object of the present subject matter is to provide a messaging system that associates each message thread with a single input mechanism to toggle the text message between translated language and original language.

These and other objects and advantages will become more apparent when reference is made to the following description and accompanying drawings.

SUMMARY OF THE INVENTION

This summary is provided to introduce concepts related to a messaging system for text message communication. The concepts are further described below in the detailed description. This summary is not intended to identify key features or essential features of the claimed subject matter, nor is it intended to be used to limit the scope of the claimed subject matter.

In an embodiment, the present disclosure relates to a messaging system for text message communication and coupled with an electronic device for operations. The messaging system comprising a user interface coupled with a processor and a memory, to display text messages; a translation selection module coupled with the processor and the user interface. The translation selection module configured to associate a translation input selection button with each of the text messages; send, upon selection of translation input selection button, the text message data with associated language code to a translation system server for translation; receive the translated text message data from the translation system server. Further, a display module is coupled with the processor and the user interface to display the translated text message retrieve from the translated text message data with the associated translation input selection button in place of the text message on the user interface.

In an aspect, the selection translation input selection button is translation icon which is being displayed along with each message.

In an aspect, the language code is pre-stored.

In an aspect, the translated text message data stores original language code and translation language code.

In an aspect, the selection translation input selection button is toggle switch, where one position of switch gives instructions to translate the text message from first language to second language and second position of switch gives instructions to translate the text message from second language to first language.

In another embodiment of the present subject matter, a method for message communication between two electronic devices coupled with a messaging system server over an internet. The method comprising receiving a text message from the messaging system server; sending, upon selection of a translation input selection button, the received text message to the translation system server with language code for translation; receiving, from the translation system server, the translated text message data; and displaying the translated text message retrieve from the translated text message data with the associated translation input selection button in place of the text message on a user interface.

In an aspect, the user interface is a display screen of an electronic device.

In an aspect, the selection translation input selection button is translation icon which is being displayed along with each text message on the user interface.

In an aspect, the selection translation input selection button is associated with the text message before and after translation.

In an aspect, the translated text message data stores original language code and translation language code.

To further understand the characteristics and technical contents of the present subject matter, a description relating thereto will be made with reference to the accompanying drawings. However, the drawings are illustrative only but not used to limit scope of the present subject matter.

BRIEF DESCRIPTION OF THE DRAWINGS

It is to be noted, however, that the appended drawings illustrate only typical embodiments of the present subject matter and are therefore not to be considered for limiting of its scope, for the invention may admit to other equally effective embodiments. The detailed description is described with reference to the accompanying figures. In the figures, the left-most digit(s) of a reference number identifies the figure in which the reference number first appears. The same numbers are used throughout the figures to reference like features and components. Some embodiments of system or methods in accordance with embodiments of the present subject matter are now described, by way of example, and with reference to the accompanying figures, in which.

DETAILED DESCRIPTION OF THE PREFERRED EMBODIMENTS

Figure 1:
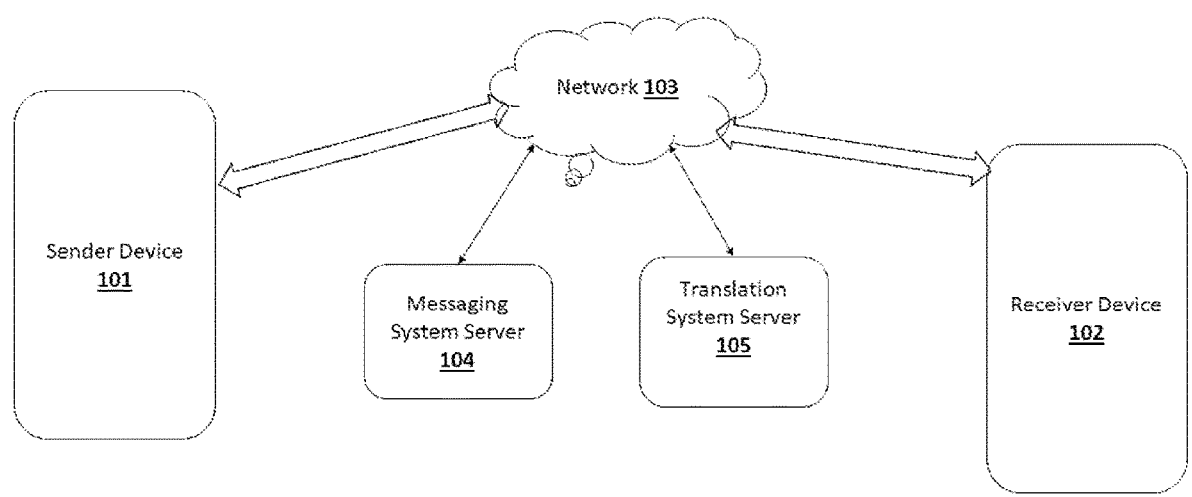
FIG. 1 illustrates a network diagram having sender device, receiver device, server of messaging system, translation server for the messaging system, in accordance with an embodiment of the present subject matter.

The detailed description of various exemplary embodiments of the disclosure is described herein with reference to the accompanying drawings. It should be noted that the embodiments are described herein in such details as to clearly communicate the disclosure. However, the amount of details provided herein is not intended to limit the anticipated variations of embodiments; on the contrary, the intention is to cover all modifications, equivalents, and alternatives falling within the scope of the present disclosure as defined by the appended claims.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may, in fact, be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

These and other advantages of the present subject matter would be described in greater detail with reference to the following figures. It should be noted that the description merely illustrates the principles of the present subject matter. It will thus be appreciated that those skilled in the art will be able to devise various arrangements that, although not explicitly described herein, embody the principles of the present subject matter and are included within its scope.

Sender device/Receiver device: it is an electronic device, such as hand-held computing device, mobile device, computer, laptop, tablet. When user is sending the data, such as text message to someone, it is acting as sender device. When user is receiving the data, such as text message, it is acting as receiver device.

Socket: A socket is one endpoint of a two-way communication link between two programs running on the network like client server. Like 'Pipe' is used to create pipes and sockets is created using 'socket' system call. The socket provides bidirectional FIFO Communication facility over the network. A socket connecting to the network is created at each end of the communication. Each socket has a specific address. This address is composed of an IP address and a port number. The socket is a program where IP address of the communication server is stored for communication between the client and the server.

Figure 4:
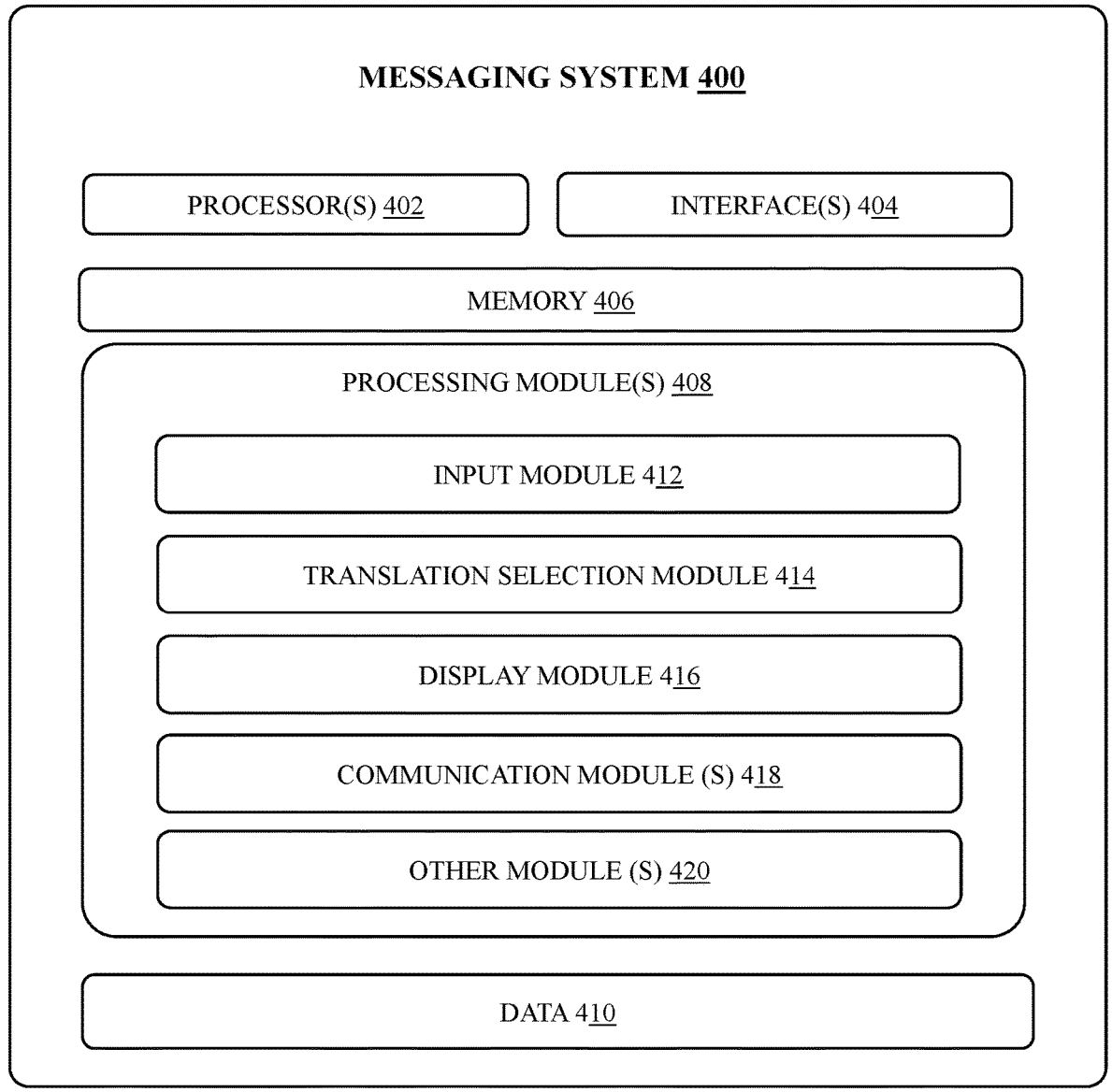
FIG. 4 illustrates a system architect of Messaging system provided installed in an electronic device, in accordance with an embodiment of the present disclosure.

Referring to FIG. 1 that illustrates a network architecture of the present subject matter. As shown, a sender device 101 and a receiver device 102 are connected to messaging system server 104 via network 103, such as Internet. Further, the messaging system server 104 is coupled to a plurality of other servers, such as banking server, news server. A messaging system 400 (as shown in FIG. 4) or a message application that is installed in the sender device 101 and the receiver device 102 for communication. The sender device 101 and the receiver device 102 may place at same location or at different location. The user of the sender device 101 sends a text message in his preferred language, for example, English to the other user who is the receiver device 102. The receiver receives the text message in English language as sent by the sender.

Figure 2A:
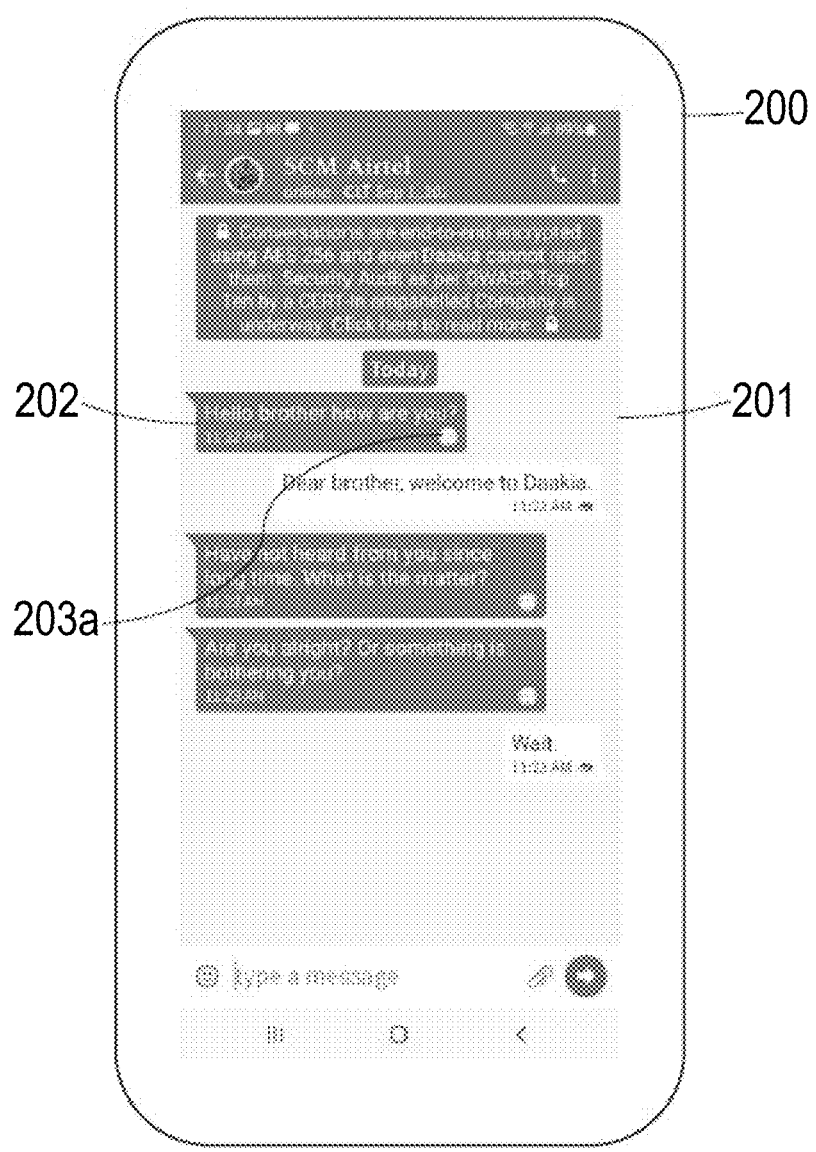
FIG. 2a depicts exemplary interface for viewing received message in receiver electronic device with a translation input button for viewing the message in another language.
Figure 2B:
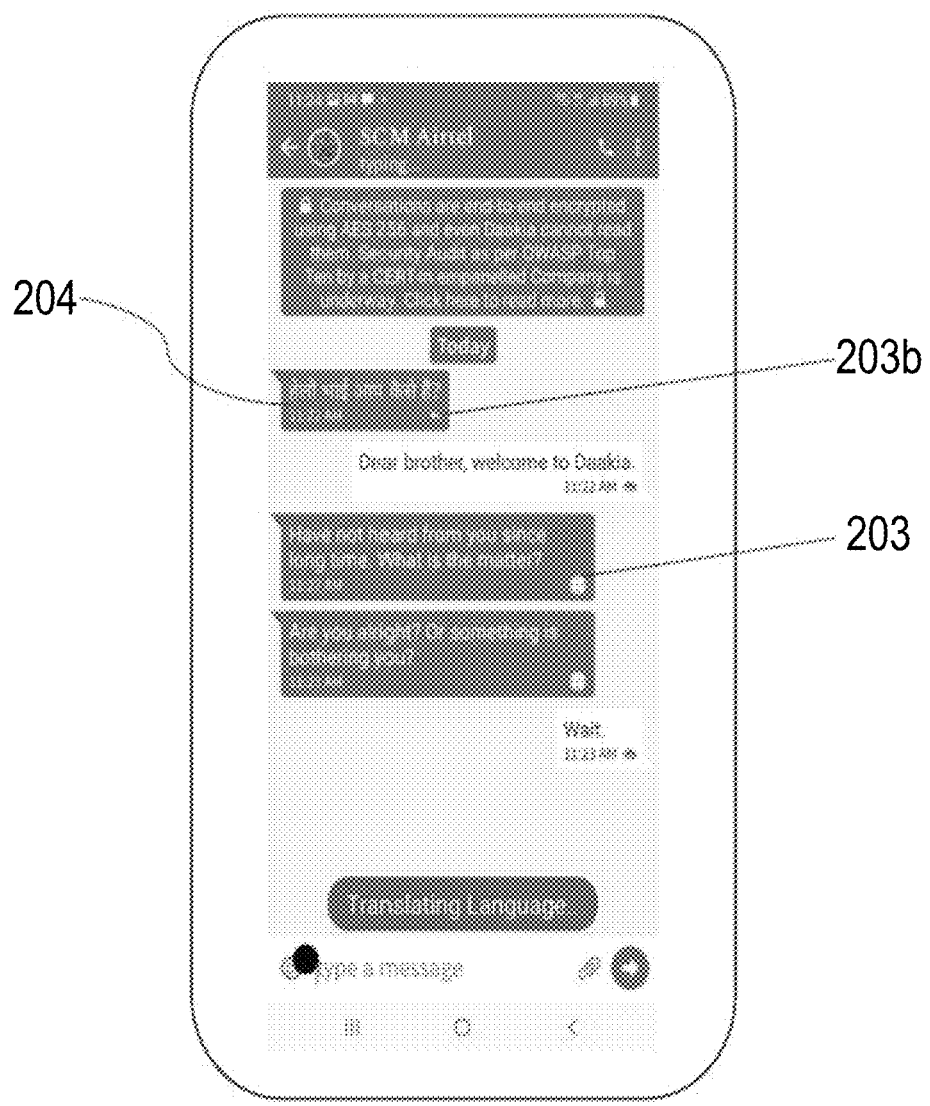
FIG. 2b depicts exemplary interface for displaying translated message in the receiver electronic device with the translation input button for viewing the message in original language.

Referring to FIGS. 2a and 2b, the user interface 201 of the messaging system 400 displays the text message 202 with a translation input selection button 203 which comprises of translation icon 203a with original text message and back icon 203b with translated text message for translating the text message 202 in another language. In another embodiment, the same translation input selection button 203 toggle in two states, i.e., translation icon 203a with original text and back icon 203b with translated text. While installing the messaging system 400 in the electronic device 101 or 102, the user selects his preferred language for translation in his profile. Upon selection of the translation input selection button 203, the messaging system 400 sends the text message 202 to the translation System Server 105 for translation and receives the translated message from the translation System Server 105 and displays the same on the user interface of the electronic device. In the present messaging system 400, the translation input selection button 203 is associated with each text message received to the user or sent by the user. The translation input selection button 203 is a toggle type switch which can be selected to translate the text message into preferred language upon selection, such as click on button displayed on touch screen of the electronic device 101 or 102 and translate the translated text message back into original language. The touch screen on the electronic device act as output as well as input device where multiple buttons can be displayed to be selected by the user.

Figure 3:
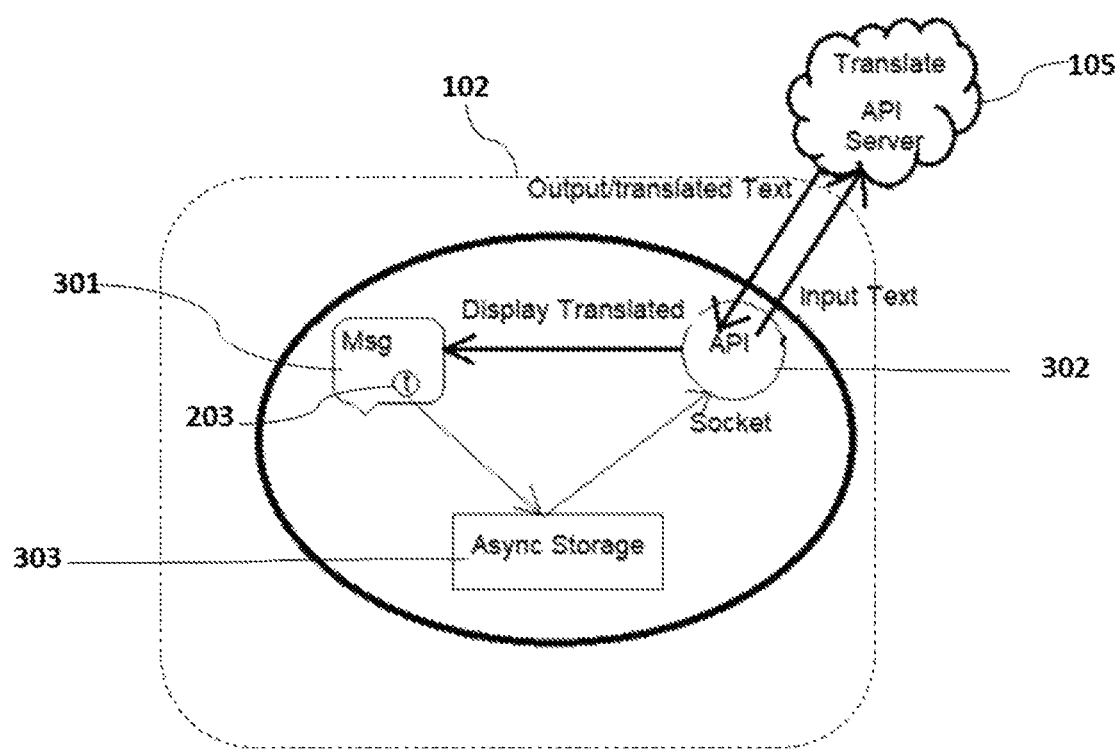
FIG. 3 illustrates an exemplary data flow diagram showing information exchange, in accordance with an embodiment of the present disclosure.

Referring to FIG. 3 illustrating is an exemplary data flow diagram showing text message exchange between a sender electronic device, the messaging system server, the translation server, and the receiver electronic device according to an exemplary embodiment. Upon coupling/installation of the messaging system 400 on the electronic device, the messaging system has a socket for communication with various server is also installed in the electronic device. The socket has communication address of the coupled systems or severs. Further, the messaging system also do communication with the communication sever 104 through the socket only. The socket as installed in the electronic device provide complete security as per the predefined protocols and server specific security conditions.

The sender electronic device 101 intend to send a text message 301 to the receiver electronic device 102. The sender electronic device 101 sends the text message 301 to the messaging server 104 via socket and the messaging server 104 sends the text message 30 to the receiver electronic device 102. The sender electronic device 101 sends the message using all safety measures which includes encryption of text message, ciphertext to receiver receiving encrypted message, decrypting and displaying the text on the receiver electronic device 102. The message 301 received on the receiver electronic device 102 is stored in a sync storage 303 of the electronic device for further processing. Upon access by the user of the receiver electronic device 102, the received message 301 is retracted from the async storage 303 of the electronic device and decrypted and displayed on the user interface of the electronic device. The user selects the translation input selection button 203 on the user interface of the messaging system 400 to translate the text message 302 into another selected language. The translation input selection button 203 act as translation icon 203a with the original text message.

The messaging system 400 of the receiver electronic device 102 sends the text message 301 with language code as stored in the profile of the receiver to the translation system server 105 via socket 302 having API of the translation system server 105. The socket or communication module 302 is integrated with application programming interface (API) of the translation system server 105 with communication address. The received text message 301 goes to the translation server 105 via the socket 302 as input text with language code. The translation server 105 sends the translated text message or output text message with translated language code and original language code to the receiver electronic device 102. The messaging system 400 receives and displays the translated text message on the user interface of the receiver electronic device 102. The messaging system 400 update the both language code, i.e., original language of text message and translated language of translated text message.

Upon receipt of the translated text from the translation system server 105, the translation input selection button 203 act as back icon 203b. When the receiver electronic device 102 selects the back icon 203b to view the translated text message into original language. The receiver electronic device 102 selects the original text from the async storage 303 and displays the same on the user interface or screen of the receiver electronic device 102. The original text message always remain store in the electronic device in encrypted form which is decrypted and displayed on clicking the back icon 203b. The translation input selection button 203 is provided with each message received. The translation input selection button 203 is associated with original text message received by a receiver as translate icon 203a and original display icon 'Back Icon' 203b with each translated text message. When the user selects the original message display back icon 203b to retrieve the text message in original language, the electronic device 102 decrypts the original message stored in memory of the electronic device 102 with the receiver's private key and displays on the electronic device 102 thereby maintaining privacy, secrecy and originality of the text message.

As shown in FIG. 4, the messaging system 400 provides a communication platform in between a plurality of users. The messaging system 400 is installed on the electronic device 101 or 102 where the user provides information, such as name, photo, location, and language for translation. The messaging system 400 includes a processor(s) 402, an interface(s) 404, and a memory 406. In an embodiment, the processor(s) 402, the interface(s) 404, and the memory 406 is same as of the electronic device 101 or 102.

The processor(s) 402 may be implemented as one or more microprocessors, microcomputers, microcontrollers, digital signal processors, logic circuitries, and/or any devices that manipulate data based on operational instructions.

Among other capabilities, the one or more processor(s) 402 are configured to fetch and execute computer-readable instructions and one or more routines stored in the memory 406. The memory 406 may store one or more computer-readable instructions or routines, which may be fetched and executed to send the text message for translation. The memory 406 may include any non-transitory storage device including, for example, volatile memory such as RAM, or non-volatile memory such as EPROM, flash memory, and the like. The received text messages get store in the memory of the electronic device.

The interface(s) 404 may include a variety of interfaces, for example, interfaces for data input and output devices referred to as I/O devices, storage devices, and the like. The interface(s) 404 may facilitate communication of the messaging system 400 with various devices, such as messaging system server 104, camera, microphone, speaker. The interface(s) 404 may also provide a communication pathway for one or more components of the messaging system 400. Examples of such components include, but are not limited to, processing modules(s) 408 and data 410.

The processing module(s) 408 may be implemented as a combination of hardware and programming (for example, programmable instructions) to implement one or more functionalities of the processing module(s) 408. In examples described herein, such combinations of hardware and programming may be implemented in several different ways. For example, the programming for the processing modules(s) 408 may be processor-executable instructions stored on a non-transitory machine-readable storage medium and the hardware for the processing modules(s) 408 may include a processing resource (for example, one or more processors), to execute such instructions. In the present examples, the machine-readable storage medium may store instructions that, when executed by the processing resource, implement the processing module(s) 408. In other examples, the processing modules(s) 408 may be implemented by electronic circuitry.

In an aspect, the processing module(s) 408 may include an input module 412, a translation selection module 414, display module 416, communication module 418 which socket and other modules 420. The processing modules(s) 408 may include other unit(s) which may implement functionalities that supplement applications or functions performed by the messaging system 400 or the processing modules(s) 408.

Further, the data 410 may include data that is either stored or generated as a result of functionalities implemented by any of the components of the processing modules(s) 408. In some aspects, the data 410 may be stored in the memory 406 in the form of various data structures. In the present subject matter, a table may be provided to store language code for translation and language code for original text message. The data structure stores all received text messages in the electronic device locally. The table is stored in the data 410 or in the memory 406. Additionally, data 410 can be organized using data models, such as relational or hierarchical data models. The data 410 may store data, including temporary data and temporary files, generated by the processing modules(s) 408 for performing the various functions of the messaging system 400.

The language codes are stored in the table as given below:

EXEMPLARY TABLE 1

| Original Language code | Language to be translated code | Message size |
|---|---|---|
| X | Y | |

In operation of the messaging system 400, the input module 412 and the display module 416 are coupled with the user interface 404 of the electronic device 102. The input module 412 provides keypad or keyboard for writing the text messages. While displaying the text message on the user interface 404 of the electronic device 102, the translation selection module 414 associates each of the text message on the messaging system with a translation input selection button 203 having translation icon 203a and back icon 203b which can be selected by the user to translate the text into preferred language and going back to original text message. The translation input selection button 203 toggles in between two positions like ON or BACK where in one position the text message is translated into another language as selected and in second position the translated text message is replaced by original message present in the receiver electronic device 102 in encrypted format.

Upon selection of the translation icon 203a associated with the selected text message, the selected text message sent to the translation system server via socket or communication module 418. The socket or communication module 418 act as communication link between the electronic device 101, 102 and the translation system server 105 and the messaging system server 104 for sending and receiving of text messages. As explained in FIG. 3, the text message with selected language code or language is being sent to the translation server for translation via socket installed along with the messaging system 400 on the electronic device 101, 102. Upon selection of the translation icon 203b, the translation selection module 414 request the communication module to establish connection with the translation system sever 105 via integrated API or coupled address. The translation system server 105 translate the text message as per the request based on the predefined standard and forwards the same to the electronic device 101 or 102. The electronic device 101, 102 receives the translated text message via socket or communication module 418. The display module 416 displays the translated text message on the user interface 404 with the translation input selection button 203.

The messaging system 400 is enabled with data encryption techniques and method for sending and receiving the text messages from the sender to receiver, receiver to sender, server to server communication to avoid unauthorized access of the text messages to protect the sensitive data shared between the sender and the receiver, thus enhancing the security of communication between the users texting through the messaging system 400.

The text message passes through data encryption and data decryption techniques and the messaging system follows a cryptographic mechanism also called a cipher for decrypting the ciphered text received form the encrypted text. The ciphered text is received by the server of the messaging system 400 to facilitate instant message transfer between the sender and the receiver on a real-time basis. The messaging system server 104 has high reliability and sustainability even under peak traffic condition which smoothen up the conversation between the sender and the receiver.

The translation input selection button 203 is provided as translation icon 203a on each text message on the user interface. The receiver translates the text message by clicking in the translation icon. The receiver clicks on the icon, upon which the text gets translated into his Preferred Language that is already saved in the messaging system. The user can also change their desired language by changing their profile and any future translation of text would then be done in the desired language.

The translation input selection button 203 is provided as back icon 203b on each translated text message on the user interface. The receiver receives the original text message by clicking in the back icon 203b. The receiver clicks on the back icon 203b, upon which the translation selection module 414 retrieves the original text message stored in the memory of electronic device.

Figure 5:
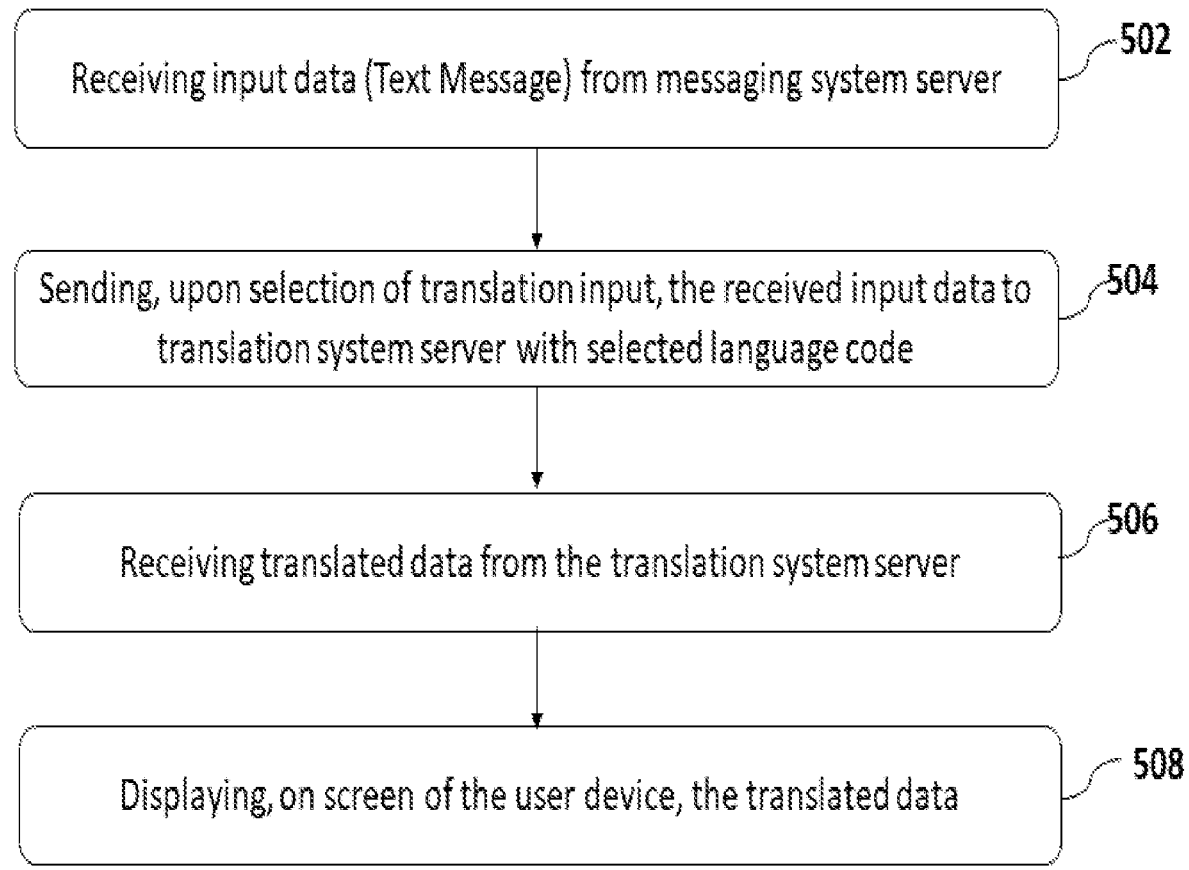
FIG. 5 illustrates a flowchart depicting sending of message to messaging server and receiving the translated message and displaying the translated message to the receiver device, in accordance with an embodiment of the present disclosure. The figures depict embodiments of the present subject matter for the purposes of illustration only. A person skilled in the art will easily recognize from the following description that alternative embodiments of the structures and methods illustrated herein may be employed without departing from the principles of the disclosure described herein.

FIG. 5 illustrating a flowchart depicting sending of message to messaging server and receiving the translated message and displaying the translated message to the receiver device, in accordance with an embodiment of the present disclosure.

At step 502, the method includes receiving input data, i.e., text message from the sender via the messaging system server via a socket. The text message is in language selected by the sender. The receiver receives the text message from the sender by complying various safety standards for digital communication.

At step 504, the method includes sending, upon selection of translation input, the received text message to translation system server with selected language code. The user (here receiver) selects the translation icon or translation input selection button which is being displayed along with the received text message on the user interface. Upon selection of the translation icon 203a, the translation selection module 414 of the messaging system 400 send the received text message with selected language code, for example, for Hindi HN or any numeric code being decided or allocated by the translation system for translation of the text message via socket having application programming interface (API) of the translation system server for communication.

At step 506, the method includes receiving translated data, i.e., translated text message along with language code of original language and translated language from the translation system server via socket.

At step 508, the method includes displaying, by the display module, the translated text message along with the translation icon on the user interface or display screen of the electronic device with a back icon 203b.

The messaging system 400 has a language codes for each language that have been decided by the coupled translation server or universally decided initials for language. For example, English language may have two letter code EN or Hindi may have two letter code HN. Similarly, numerical code may be provided to the language, such as English language has 10 and Hindi language has 11. These codes are pre-decided by the messaging system and the translation server.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

We claim:

1. A method for message communication between two electronic devices over an internet, the method comprising:
   receiving, by a socket, one or more text messages from a messaging system server;
   displaying the text message in a user interface;
   linking, by a translation selection module, one or more translation input selection buttons with each of the one or more text messages before translation, wherein the translation input selection button is configured to convert the linked text message from a first language to a second language upon selection of the translation input selection button corresponding to the linked text message;
   determining whether the translation input selection button is selected;
   sending, by the socket, in response to determining the selection of the linked translation input selection button, the received text message to a translation system server with language code for the translation;
   receiving, from the translation system server by the socket, translated text message data;
   linking, by the translation selection module, the translation input selection button with a translated text message retrieved from the translated text message data; and
   displaying the translated text message retrieved from the translated text message data with the linked translation input selection button in place of the text message on the user interface.

2. The method of claim 1, wherein the user interface is a display screen of an electronic device.

3. The method of claim 1, wherein the selection-translation input selection button is a translation icon that is displayed along with each text message on the user interface.

4. The method of claim 1, wherein the translated text message data stores original language code and translation language code.

5. The method of claim 1, wherein the method further comprises:
   determining whether the translation input selection button associated with the translated text message retrieved from the translated text message data is selected;
   displaying, in response to determining the selection of the translation input selection button associated with the translated text message retrieved from the translated text message data, the text message in place of the translated text message on the user interface; and
   associating, by the translation selection module, the translation input selection button with the text message.

6. A messaging system operable to perform the method according to claim 1, the messaging system comprising:
   one or more sockets communicably coupled to the messaging system server and the translation system server;
   one or more translation input selection buttons configured to be associated with the one or more text messages and one or more translated text messages;
   one or more user interfaces communicably coupled to at least one of the one or more sockets, at least one of the user interfaces configured to display the one or more text messages, the one or more translated text messages, and the one or more translation input selection buttons;
   one or more translation selection modules comprising one or more processors, the translation selection modules communicably coupled to at least one of the one or more sockets and at least one of the one or more user interfaces.

7. The messaging system of claim 6, wherein at least one of the one or more user interface is a display screen of an electronic device.

8. The messaging system of claim 6, wherein at least one of the one or more translation input selection buttons is a translation icon that is displayed along with each text message on the user interface.

9. The messaging system of claim 6, wherein the translated text message data stores original language code and translation language code.

10. The messaging system of claim 6, wherein the messaging system is further operable to:
    determine whether the translation input selection button linked with the translated text message retrieved from the translated text message data is selected;
    display, in response to determining the selection of the translation input selection button linked with the translated text message retrieved from the translated text message data, the text message in place of the translated text message on the user interface; and
    link the translation input selection button with the text message.

* * * * *